J. E. VAN RIPER.
Harrow.

No. 67,466.

Patented Aug. 6, 1867.

Witnesses:
H. F. Eberts
H. S. Sprague

Inventor:
John E. Van Riper
by his atty Thos S Sprague

United States Patent Office.

JOHN E. VAN RIPER, OF DEARBORN, MICHIGAN.

Letters Patent No. 67,466, dated August 6, 1867.

---

IMPROVEMENT IN HARROWS.

---

The Schedule referred to in these Letters Patent and making part of the same.

---

TO WHOM IT MAY CONCERN:

Be it known that I, JOHN E. VAN RIPER, of Dearborn, in the county of Wayne, in the State of Michigan, have invented a new and useful Improvement in Harrows; and I do declare that the following is a true and accurate description thereof, reference being had to the accompanying drawings, and to the letters of reference marked thereon, being a part of this specification.

I build my harrow in three sections, A B C. I use three bars, D D D, in each section. These bars D D D, &c., are made in the form of an elongated gothic letter S, as shown in fig. 1. Across these bars D D D, &c., I place other bars, E E E, &c., five in number. The teeth of the harrow are passed through square openings through the bars D D D, &c., and the bars E E E, &c., at their points of intersection, and are fastened on the top by a proper nut. There is a shoulder, F, on the back side of the teeth, as shown in fig. 2, which acts as a brace and strengthens the combination of the whole apparatus. To the front of the harrows I attach the folding draught-bar H by means of links I I. This draught-bar H is constructed with hinges or other proper joints, K K, to allow the ends of the bar to be folded or raised when circumstances require. The three sections A B C of the harrow I join together by link-couplings O O, &c.

The same letters in each figure refer to similar parts.

Figure 1:
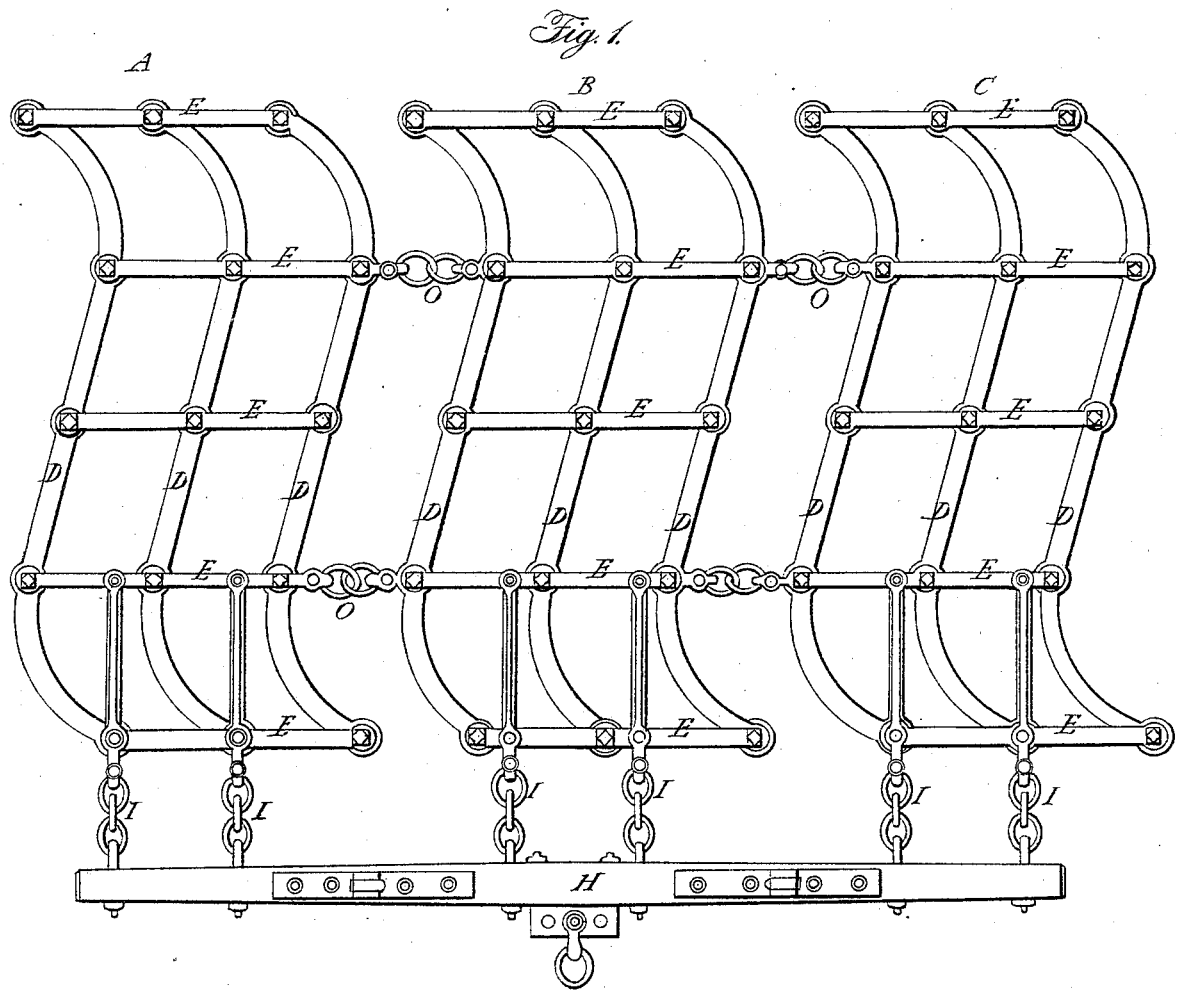
Figure 1 is a top view of my harrow.
Figure 2:
Figure 2 is a representation of the form of the teeth.

What I claim as my invention, and desire to secure by Letters Patent, is—

1. The folding draught-bar H constructed with hinges or other joints, for the purpose described.

2. The combination and arrangement of the three sections A B C, the link-couplings I I and O O, &c., and the folding draught-bar H, arranged substantially as described for the purpose designed.

JOHN E. VAN RIPER.

Witnesses:
    H. F. EBERTS,
    R. J. EBERTS.